April 9, 1940.  J. GRAVENOR ET AL  2,196,916
LUBRICATING SYSTEM AND PUMP FOR USE THEREIN
Filed Nov. 18, 1938
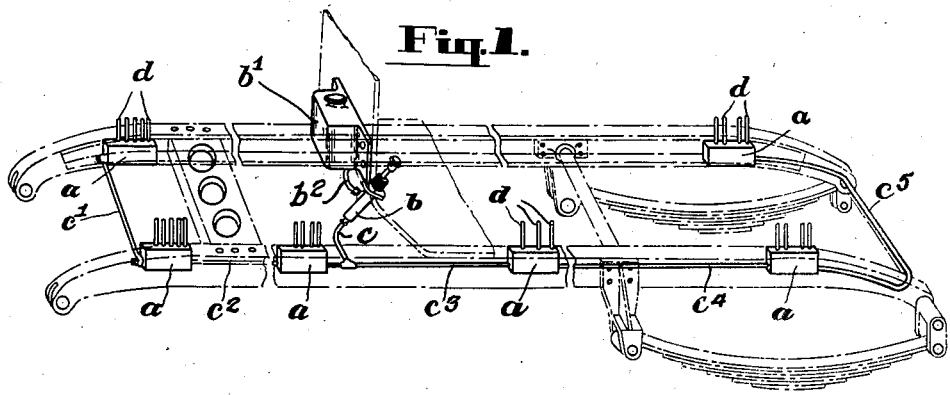
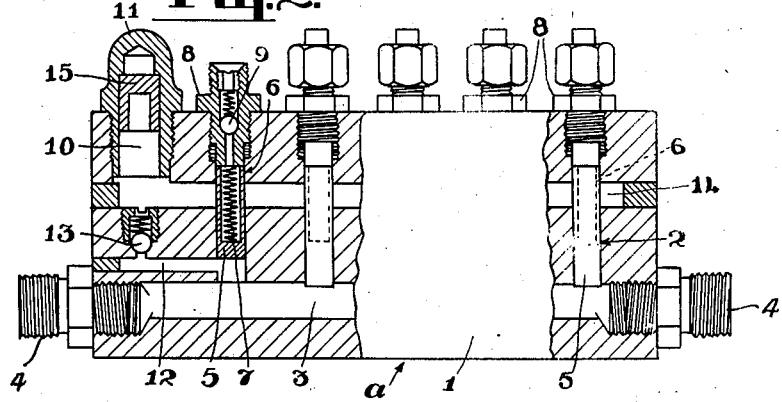
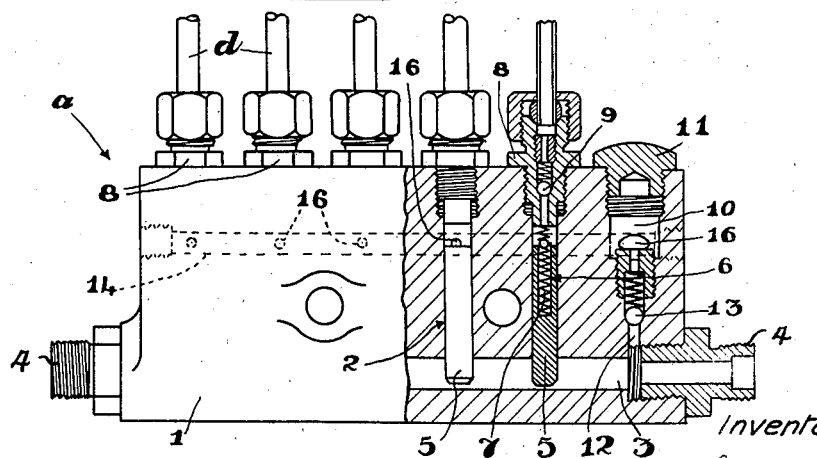
Inventors:
James Gravenor and Evrard L. Armitage,
by
Smith, Michael & Gardiner,
Attorneys.

Patented Apr. 9, 1940

2,196,916

UNITED STATES PATENT OFFICE 2,196,916

LUBRICATING SYSTEM AND PUMP FOR USE THEREIN

James Gravenor and Evrard Leathley Armitage, Weydon Hill, Farnham, England

Application November 18, 1938, Serial No. 241,286
In Great Britain August 21, 1937

2 Claims. (Cl. 184—7)

This invention has reference to lubricating systems and pump units for use in connection with such systems.

One object of the invention is to provide for the feeding of lubricant to a plurality of different points by the actuation of a main or primary pump.

A further object of the invention is to provide means whereby lubricant is delivered to each point by a separate plunger.

Another object of the invention is to provide for the use of a minimum length of piping to the several points to be lubricated.

A still further object of the invention is to provide for the volume of lubricant delivered to each point to be individually regulated and adjusted.

The invention also has for its object an improved construction of hydraulically operated pump unit which is adapted to be actuated at slow speeds without detriment to its efficiency.

These and other objects of the invention will be more readily understood by reference to the following description in connection with the accompanying drawing which illustrates the invention.

In the drawing:

Figure 1 is a diagrammatic perspective view of a motor vehicle chassis embodying a lubricating system in accordance with the present invention.

Figure 2 is an elevation, partly in section, of a pump unit for use in the said system, and Figure 3 is an elevation, also partly in section, of a modified or alternative pump unit.

As shown in Figure 1 of the said drawing, the lubricating system comprises a number of pump units $a$ which are connected in series with one another and with the working chamber of a primary or main pump $b$, by piping $c$, $c^1$, $c^2$, $c^3$, $c^4$, $c^5$. Lubricant is fed to the primary pump $b$ from a storage tank $b^1$ by a length of piping $b^2$. At each stroke of the said primary pump (which may be manually or mechanically operated) the lubricant is forced into and through the supply piping $c$—$c^5$ to each and all of the units $a$, the gradually increasing pressure in the said piping being utilised for operating the units $a$ as hereinafter described.

Each unit $a$ may be arranged to deliver lubricant under pressure to one or more points, and when a number of points are arranged in a group or in close proximity to one another (for example, in the region of each of the stub-axles of an automobile road wheel) a pump unit is mounted as near as possible to the said group so that the length of the several lubricant delivery pipes $d$ may be small. On the other hand, the distance between the separate groups or the individual points may be of any dimension.

Figure 1 of the drawing shows the lubricating system applied to the chassis of a motor road vehicle, but the system may be used for other purposes if desired.

The pump unit $a$ shown in Figure 2, comprises a block or casting 1 having five cylindrical bores or housings 2 located in a common plane and at right angles to the longitudinal axis of the block. Each of these housings opens, on the one hand, onto one and the same side of the block and on the other hand into a common passage 3 which extends from end to end of the said block, and which is adapted to be connected into and form a part of the supply piping $c$—$c^5$ by coupling lengths of said piping to unions 4. This unit is adapted to deliver lubricant to five separate points, and if a fewer number of points are to be served, the number of bores or housings 2 is correspondingly reduced.

A cylindrical plunger 5 is accommodated in each of the housings 2; each of the said plungers is a sliding fit within its complementary housing and is drilled axially from its end remote from the passage 3 to produce a pocket 6 in which a coiled spring 7 is inserted.

Each bore or housing 2 is fitted, at its end which opens to the outside of the block 1, with a union 8 which is adapted to be connected to a point to be lubricated, by a length of piping $d$. Each union 8 comprises a non-return spring loaded ball valve 9 and its inner end serves as a stop for limiting the working stroke of the complementary plunger 5, and also as an abutment for the spring 7. Hence, by adjusting a union within its plunger-housing, the length of the working stroke of each plunger, and hence the volume of lubricant delivered per working stroke, may be varied independently as desired.

The block 1 is also provided with a chamber 10 which is of greater diameter than the plunger housings 2 and is provided with a hollow dome-like or recessed cap 11. This chamber 10 has communication with the passage 3 by way of a duct 12 which is normally closed by a spring-loaded, non-return ball valve 13.

The duct 12 opens into the next adjacent plunger housing 2 and the plunger 5 in the said adjacent housing 4 is shorter than the remaining plungers of the unit, so that, at the end of its working stroke, it uncovers the said duct and enables lubricant to flow from the passage 3 into the duct 12. When the plunger reaches the end of its working stroke, the pressure of lubricant in the passage 3 is at its maximum and, therefore, immediately the duct 12 is uncovered, the valve 13 will be opened against its spring and the reservoir 10 will be filled with lubricant at a high pressure.

A second or auxiliary lubricant supply passage 14 is provided within the block in superimposed and parallel relationship to the main passage 3, said auxiliary passage being arranged to extend from the bottom of the reservoir 10 and to traverse the working chambers of each of the plunger housings 2 in succession, and thereby put the said working chambers in communication with the interior of the storage chamber 10 so that they be filled with lubricant. When the said plungers commence their working strokes, the working chambers are cut off from the auxiliary supply passage 14 and the storage chamber 10, and lubricant is trapped between the plungers and the unions; for this purpose the passage 14 is preferably of smaller diameter than the plunger 5.

A piston 15 is housed within the chamber 10 and is adapted to trap a volume of air within the domed cap 11 of the said chamber, the said piston being forced upwardly when the high pressure lubricant enters the reservoir from the duct 12, to compress the said air. The provision of this piston 15 is not essential and may be omitted if desired.

When the manually or mechanically operated primary pump $b$ is actuated, it discharges lubricant through the supply piping to the main passage 3 in each of the pump units of the system so that the pressure of the lubricant within the said pipe and passages gradually increases and displaces all the plungers 5 simultaneously within their bores or housings 2 against the return springs 7. The plungers of each unit thus cut off communication between the complementary auxiliary supply passage and their working chambers so that lubricant is trapped in the latter and the continued movement of the said plungers discharges the trapped lubricant under pressure through the unions 8 and connecting pipes $d$ to each of the points to be lubricated. As the plunger in the housing adjacent the storage chamber 10 approaches the end of its working or delivery stroke, it uncovers the duct 12 so that lubricant, which is then at its maximum pressure, can flow from the main supply passage 3, through the said duct past the non-return valve 13, into the interior of the said storage chamber. This high-pressure lubricant forces the piston 15 upwards into the domed cap 11 so that air within the storage chamber is trapped and compressed.

When the primary pump commences to make its return or suction stroke, during which it draws a fresh charge of lubricant from the tank or similar container $b^1$, it relieves the pressure within the supply pipe $c$—$c^5$ and the passages 3. The valve 13 closes and then the whole of the pistons in the pump units are permitted to make their return strokes simultaneously under the action of their respective return springs and as they reach the end of this movement they uncover the auxiliary supply passsage and re-establish communication between the storage reservoir and the working chambers of each unit. The compressed air in each of the dome-like caps thereupon forces the lubricant out of the storage chambers, along the respective auxiliary passages into each working chamber of the several pump units. The cycle of operations may then be repeated.

When the primary pump is operated mechanically, it may be driven through a suitable reduction gear, for instance, by a rotating shaft within the gear box of the motor car, so that lubrication of the several points is ensured whenever the car is in motion.

Figure 3 shows a modified or alternative construction of pump unit in which the jamming or non-operation of any one of the plungers can have no effect on the delivery of lubricant by the other plungers. In this alternative construction, the duct from the main supply passage 3 to the storage chamber 10 of each pump unit leads directly from the said passage to the bottom or innermost end of the reservoir, and the plungers are all of the same dimensions.

The said duct is normally closed by a spring-loaded non-return ball or similar valve 13 which is of a smaller cross-sectional area than the said pistons, whereas the springs acting on the valve and pistons may be of the same strength. Hence, as the pressure of the lubricant in the main supply passage 3 rises, a greater force will be exerted on the pistons than on the valve and the former will commence their working or delivery strokes and close the inlet orifices from the auxiliary passage 14 to the several working chambers, before the valve 13 is raised from its seating. Or, alternatively, the cross-sectional areas of the spring-loaded non-return valve and the pistons, and the strength of the respective loading springs may be of any other desired dimensions or values provided that the valve is allowed to remain upon its seating until the pistons have closed the inlet orifices from the auxiliary passage to the several working chambers.

Further, the said auxiliary passage 14 is located to one side of the row of housings 2 and is arranged to communicate with the reservoir and each of the working chambers through radial ports 16 so that should one of the plungers 5 fail to operate for any reason it will not interfere with the supply of lubricant to any of the working chambers of the other plunger-housings.

A pump constructed in accordance with the present invention has the advantage that internal leakage of the lubricant is prevented, so that the system may be operated at low speeds without loss of efficiency.

Having described our invention what we claim and desire to secure by Letters Patent is:

1. A lubricating device for use with a lubricant supply line having means therein for varying the pressure existing in said line, said device comprising a block formed with a single supply passage extending through the block and constituting a part of the supply line, said block having a plurality of bores therein each having its inner end in communication with the single supply passage and each connected at its outer end with a part to be lubricated, said block having a single auxiliary passage extending through substantially the entire block and communicating with each of the plurality of bores intermediate the end of each bore, a plunger slidable in each bore and having its inner end subjected to increase and decrease of pressure in said supply passage whereby an increase in pressure within said passage will force each plunger toward the outer end of its associated bore to cut off communication between said bores and the auxiliary passage and to expel lubricant from that portion of each bore beyond the communication with said auxiliary passage, a spring between the outer end of each bore and the outer end of each plunger and adapted, upon a decrease in pressure in said single supply passage, to move said plunger inwardly in its associated bore to establish communication between said bore and said auxiliary passage, a single lubricant storage chamber in said block having a closed upper end and communicating at its lower end with said auxiliary passage and of a capacity to supply lubricant to all of the bores between their outer ends and the outer ends of their associated plungers when said plungers have been moved by said springs to establish communication between the bores and said auxiliary passage, a single duct in said block extending between said single supply passage and the lower end of said storage chamber, and a spring-loaded non-return valve in said duct and opening toward said chamber to permit flow of lubricant under pressure through said duct from said single supply passage to said single storage chamber but preventing reverse flow of lubricant through said duct, whereby the supply chamber is filled with lubricant from said supply passage.

2. A lubricating device for use with a lubricant supply line having means therein for varying the pressure existing in said line, said device comprising a block formed with a single supply passage extending through the block and constituting a part of the supply line, said block having a plurality of bores therein each having its inner end in communication with the single supply passage and each connected at its outer end with a part to be lubricated, said block having a single auxiliary passage extending through substantially the entire block and communicating with each of the plurality of bores intermediate the ends of each bore, a plunger slidable in each bore and having its inner end subjected to increase and decrease of pressure in said supply passage whereby an increase in pressure within said passage will force each plunger toward the outer end of its associated bore to cut off communication between said bores and the auxiliary passage and to expel lubricant from that portion of each bore beyond the communication with said auxiliary passage, a spring between the outer end of each bore and the outer end of each plunger and adapted, upon a decrease of pressure in the single supply passage, to move said plunger inwardly of its associated bore to establish communication between said bore and said auxiliary passage, a single lubricant storage chamber in said block having a closed upper end and communicating at its lower end with said auxiliary passage and having a capacity sufficient to supply lubricant to all of the bores between their outer ends and the outer ends of their associated plungers when said plungers have been moved by said springs to establish communication between the bores and the auxiliary passage, a single duct in said block extending between said storage chamber and one of the plurality of bores and adapted to be placed in communication with the single supply passage after the plunger in said one bore moves toward the outer end of its associated bore and to be cut off from communication with said supply passage after the plunger in said one bore moves toward the inner end of its associated bore, and a spring-loaded non-return valve in said duct and opening towards said chamber to permit flow of lubricant under pressure through said duct from said single supply passage to said single storage chamber after said duct is placed in communication with the supply passage but preventing reverse flow of said lubricant through said duct, whereby the supply chamber is filled with lubricant from said supply passage.

JAMES GRAVENOR.
EVRARD L. ARMITAGE.